United States Patent

Matsuda et al.

[11] Patent Number: 5,412,380
[45] Date of Patent: May 2, 1995

[54] ELECTRONIC CROSSPOINT SWITCHING DEVICE OPERATING AT A HIGH SIGNAL TRANSMISSION RATE

[75] Inventors: Yoshio Matsuda; Harufusa Kondoh; Hiromi Notani; Isamu Hayashi, all of Hyogo, Japan

[73] Assignee: Mitsubishi Denki Kabushiki Kaisha, Tokyo, Japan

[21] Appl. No.: 953,344

[22] Filed: Sep. 30, 1992

[30] Foreign Application Priority Data

Jan. 18, 1992 [JP] Japan .................. 4-006959

[51] Int. Cl.$^6$ .............................................. H04Q 3/52
[52] U.S. Cl. .................. 340/825.85; 340/825.9; 340/825.93; 327/432
[58] Field of Search ............. 340/825.79, 825.85, 340/825.86, 825.87, 825.89, 825.9, 825.92, 825.93, 825.91; 307/241, 495, 570

[56] References Cited

U.S. PATENT DOCUMENTS

| | | | |
|---|---|---|---|
| 3,760,361 | 9/1973 | Leger et al. | 340/825.91 |
| 4,817,082 | 3/1989 | Orsic | 340/825.85 |
| 4,949,086 | 8/1990 | Hoffmann | 340/825.85 |
| 4,963,863 | 10/1990 | Hoffmann | 340/285.79 |
| 5,060,192 | 10/1991 | Young et al. | |
| 5,126,734 | 6/1992 | Harrand | 340/825.92 |

FOREIGN PATENT DOCUMENTS

| | | |
|---|---|---|
| 0262479 | 4/1988 | European Pat. Off. |
| 0264046 | 4/1988 | European Pat. Off. |
| 0451312A1 | 10/1991 | European Pat. Off. |

OTHER PUBLICATIONS

Digest Of Technical Papers, 1990 IEEE International Solid-State Circuits Conference, Masao Akata et al, pp. 30-31, 257; Feb. 1990; Telecommunication Circuits.

*Primary Examiner*—Michael Horabik
*Attorney, Agent, or Firm*—Lowe, Price, LeBlanc & Becker

[57] ABSTRACT

A crosspoint LSI adapted to an exchanger in ISDN, for transmission of asynchronous transfer mode (ATM) cells in communication is provided. The crosspoint switching LSI includes many unit switch cells arranged in rows and columns. When a unit switch cell is turned on, the unit switch cell responds to a differential data signal on an input data line to drive differentially an output data line pair. The unit switch cells operate differentially so that the data signals of the ATM cells are transmitted, which improves a signal transmission rate.

18 Claims, 16 Drawing Sheets

FIG.10

| INPUT LINE (N1) | N2 | N3 | N4 | N5 | N6 |
|---|---|---|---|---|---|
| (CMOS LEVEL) | (TTL LEVEL) | SWITCH ON/OFF | SWITCH ON/OFF | (TTL LEVEL) | (CMOS LEVEL) |
| $V_{DD}$ | $V_{DD} - V_{BE}$ | $V_{DD}-V_{BE}$ / $V_{DD}-2V_{BE}$ | $V_{DD}-2V_{BE}$ / $V_{DD}-3V_{BE}$ | $V_{DD} - 2V_{BE}$ | $V_{DD}$ |
| $V_{SS}$ | $V_{DD}$ | $V_{DD}$ / $V_{DD}-V_{BE}$ | $V_{DD}-V_{BE}$ / $V_{DD}-2V_{BE}$ | $V_{DD} - V_{BE}$ | $V_{SS}$ |

ELECTRONIC CROSSPOINT SWITCHING DEVICE OPERATING AT A HIGH SIGNAL TRANSMISSION RATE

BACKGROUND OF THE INVENTION

1. Field of the Invention

The present invention relates generally to electronic crosspoint switching devices in communication, and particularly to improvements of signal transmission rates on electronic crosspoint switching devices. The present invention has particular applicability to a crosspoint switching large scale intergration (LSI) for switching data in an asynchronous transfer mode (ATM) in an integrated services digital network (ISDN).

2. Description of the Background Art

Recently, expectation to an asynchronous transfer mode (hereinafter referred to ATM) in a Broadband Integrated Services Digital Network (hereinafter referred to BISDN) has been increasing. An ATM is known as a network applicable to communication services of various transfer rates, and also of various conversion modes.

FIG. 11 is a conceptional view showing a conception of a communication system utilizing an ATM. Referring to FIG. 11, a user terminal 201 is connected to an ATM exchange device 202 in an BISDN network 200 via a subscriber line. In the ATM, a series of data to be transmitted are divided into short data blocks called "ATM cells". Each ATM cell is inserted into a time slot repeated at predetermined cycle, and is transmitted. Each ATM cell includes a header section HD having a destination address, and a data section DT having data to be transmitted. One ATM cell has a data length of 53 bites in total.

Referring to FIG. 12, the ATM exchange device 202 includes input lines 241, 242, . . . and output lines 251, 252, . . . . The input lines 241, 242, . . . are connected to user terminals, for example, via subscriber lines. The output lines 251, 252, . . . are connected to devices to which data are directed. The ATM exchange device 202 receives an ATM cell serially via each input lines 241, 242, . . . , and selectively outputs the same to one of the output lines 251, 252, . . . according to a destination address in the header section HD of the ATM cell. The above exchange operation is carried out for each ATM cell.

FIG. 13 is a block diagram of a conventional ATM exchange device. The ATM exchange device shown in FIG. 13 is described in DIGEST OF TECHNICAL PAPERS, 1990 IEEE International Solid-State Circuits Conference, pp. 30-31. Referring to FIG. 13, packet buffers 231 to 23m respectively receive ATM cells to be transmitted. The ATM cells temporarily held in the packet buffers 231 to 23m are applied to a crosspoint switching LSI (a crosspoint switching device) 220 via the input lines 211 to 21m. A scheduling module 230 receives switching control data for the crosspoint switching LSI 220 from the ATM cells in the packet buffers 231 to 23m, and applies the switching control data SCD to the crosspoint switching LSI 220, referring to destination addresses in the header sections HD of the ATM cells.

The crosspoint switching LSI 220 selectively connects an input line and an output line at each time slot in response to the switching control data SCD, and thus the ATM cells on the input lines 211 to 21m are led to the output lines 221 to 22n in response to the destination addresses included therein.

FIG. 14 is a block diagram of a conventional crosspoint switching LSI. Referring to FIG. 14, a crosspoint switching LSI 300 includes a switch cell matrix 106 in which unit switch cells 105 are arranged in m rows and n columns, an input data register 101 connected to the input lines 211 to 21m, an output data register 102 connected to the output lines 221 to 22n, a switching control register 104 holding switching control data, and a row selecting decoder 103.

One unit switch cell 105 includes a master latch circuit 111, a slave latch circuit 110, and a tristate buffer 109. The master latch circuit 110 holds a switching control signal CNT at a present time slot, while the slave latch circuit 111 holds a switching control signal at a subsequent time slot. The tristate buffer 109 electrically connects an input data line 107 and an output data line 108 in response to the present switching control signal CNT latched in the master latch circuit 110.

FIG. 15 is a circuit block diagram of the switch cell matrix 106 shown in FIG. 14. Referring to FIG. 15, switch cells are arranged in m rows and n columns. For example, the one switch cell 105 is connected to the input data line 107 and the output data line 108. The m input data lines are arranged in a row direction, and connected respectively to the corresponding input latch circuits in the input data register 101. The n output data lines are arranged in a column direction, and connected respectively to the corresponding output latch circuits in the output data line register 102.

FIG. 16 is a schematic diagram a circuit of a conventional unit switch cell. Referring to FIG. 16, the switch cell includes the tristate buffer 109, the slave latch circuit 110, and the master latch circuit 111. The tristate buffer 109 includes NMOS transistors 120 and 121 serially connected between a power supply potential $V_{DD}$ and a ground potential $V_{SS}$ and two NOR gates 122 and 123.

The tristate buffer 109 operates as follows. First, when the slave latch circuit 110 holds the switch control signal CNT at a low level, the tristate buffer 109 electrically connects the input data line 107 and the output data line 108. More specifically, when the input data line 107 is at a high level, the output data line 108 is at a low level. When the input data line 107 is at a low level, the output data line 108 is at a high level. In other words, data on the input data line 107 is transmitted to the output data line 108.

When the slave latch circuit 110 holds the switching control signal CNT at a high level, the input data line 107 and the output data line 108 are not electrically connected. More specifically, since both of the transistors 120 and 121 are turned off, the output data line 108 is rendered in a high impedance state with respect to an output of the tristate buffer 109. Data on the input data line 107 is not transmitted to the output data line 108.

The switching control signal CNT for controlling the tristate buffer 109 is applied as follows. Referring to FIG. 17, it is assumed that four ATM cells AC1 to AC4 in time slots TS1 to TS4 are applied to the input lines 241, 242, . . . of the AMT exchange device 202 shown in FIG. 12. The switching control register 104 (shown in FIG. 14) temporarily holds a switching control signal in response to a destination address included in the header section HD of each ATM cell.

In the time slot TS1, as shown in FIG. 17, it is assumed that the slave latch circuit 110 latches a switching control signal CNT 1, and that the master latch circuit 111 holds a switching control signal CNT 2. The slave latch circuit 110 provides the present switching control signal CNT 1 as an output, so that the tristate buffer 109 connects the input data line 107 and the output data line 108 in response to the signal CNT 1. The ATM cell AC1 on the input data line 107 is then applied to the output data line 108.

In the subsequent time slot TS2, being provided with an update signal UD via a signal line 114, the slave latch circuit 110 holds the switching control signal CNT 2 held in the master latch circuit 111. The master latch circuit 111 holds a new switching control signal CNT 3 on a signal line 113 in response to a selecting signal SEL applied from a row selecting decoder (shown in FIG. 14). In response to the switching control signal CNT 2 held in the slave latch circuit 110, the tristate buffer 109 connects the input data line 107 and the output data line 108 in the time slot TS2, so that the ATM cell AC2 on the input data line 107 is applied to the output data line 108.

By repeating the above operation for each time slot, ATM cells on the input data line are applied to the output data line. Although in the above description, the ATM cells AC1 and AC2 are transmitted between the same input data line 107 and the same output data line 108 in the two time slots TS1 and TS2, if the destination address in the ATM cell AC2 is different from that in the ATM cell AC1, the tristate buffer 109 shown in FIG. 16 is turned off, and a tristate buffer in another row is turned on. As a result, an ATM cell on an input data line of another row is applied to the output data line 108.

When the unit switch cell shown in FIG. 16 is used in a crosspoint LSI, the following problems arise. First, a slow operation rate of the tristate buffer 109 is pointed out. An output voltage for driving the output data line 108 is output in response to gate voltages VG1 and VG2 of the transistors 120 and 121. The output data line 108 could not be driven at a high speed, since the input data line 107 has its level changed within a range of a MOS level, 0 to 5 volts.

In addition, four MOS transistors are generally required for constitution of one NOR gate, and thus, the tristate buffer 109 shown in FIG. 16 requires ten MOS transistors in total. This increases an occupied area of the crosspoint switching LSI on a semiconductor substrate. More specifically, integration of the crosspoint switching LSI has been reduced and the number of lines which can be switched has been restricted.

SUMMARY OF THE INVENTION

One object of the present invention is to improve the signal transmission rate in an electronic crosspoint switching device.

Another object of the present invention is to improve integration of an electronic crosspoint switching device on a semiconductor substrate.

Still another object of the present invention is to transmit an ATM cell in an BISDN at a higher frequency in a crosspoint switching LSI.

A further object of the present invention is to improve integration on a semiconductor substrate of a crosspoint switching LSI for switching an ATM cell in an BISDN.

Briefly, in accordance with one aspect of the present invention an electronic crosspoint switching device includes a plurality of input data line pairs arranged in a row direction, which transmit a plurality of differential input data signals, respectively; a plurality of output data line pairs arranged in a column direction, which transmit a plurality of differential output data signals, respectively; and a plurality of switch cells arranged in rows and columns which selectively apply a differential signal on one of the plurality of input data line pairs to one of the plurality of output data line pairs. Each switch cell includes a switching control signal storage circuit storing a switching control signal for controlling a connection between a corresponding input data line pair and a corresponding output data line pair; a differentially driving circuit differentially driving a corresponding output data line pair in response to a differential potential on a corresponding input data line; and an enabling means, responsive to the switching control signal stored in the switching control signal storage circuit for enabling the differentially driving circuit.

In operation, each switch cell outputs a differential output data signal in response to a differential input data signal. A switching operation in the switch cell is carried out by means of the differential potential, so as to obtain a high signal transmission rate. A reduced occupied area of the electronic crosspoint switching device is also obtained on the semiconductor substrate.

According to another aspect of the present invention, an electronic crosspoint switching device includes a plurality of input data lines arranged in a row direction, which transmit a plurality of input data signals, respectively; a plurality of output data lines arranged in a column direction, which transmit a plurality of output data signals, respectively; and a plurality of switch cells arranged in rows and columns, which selectively apply a signal on one of the plurality of input data lines to one of the plurality of output data lines. Each switch cell includes a switching control signal storage circuit storing a switching control signal for controlling a connection between a corresponding input data line and a corresponding output data line, and an output data signal applying circuit applying an output data signal defined by a TTL level to the corresponding output data line in response to a signal on the corresponding input data line. When the switching control signal storage circuit stores a switching signal designating enabling, the output data signal applying circuit provides preferential logical signals as output data signals in response to the signal on the corresponding input data line. When the switching control signal storage circuit stores a switching control signal designating disabling, the output data signal applying circuit provides non-preferential logical signals as output data signals in response to the signal on the corresponding input data line. Potentials of the plurality of output data lines are determined by the preferential logical signals provided from the switching control signal storage means.

In operation, an output data signal applying circuit in each switch cell applies an output data signal defined by the TTL level, so that the signal transmission rate becomes higher than that of an output data signal changing in a range of a conventional MOS level.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a table showing voltage transmission of each node in the unit switch cell shown in FIG. 7.

DESCRIPTION OF THE PREFERRED EMBODIMENTS

Figure 1:
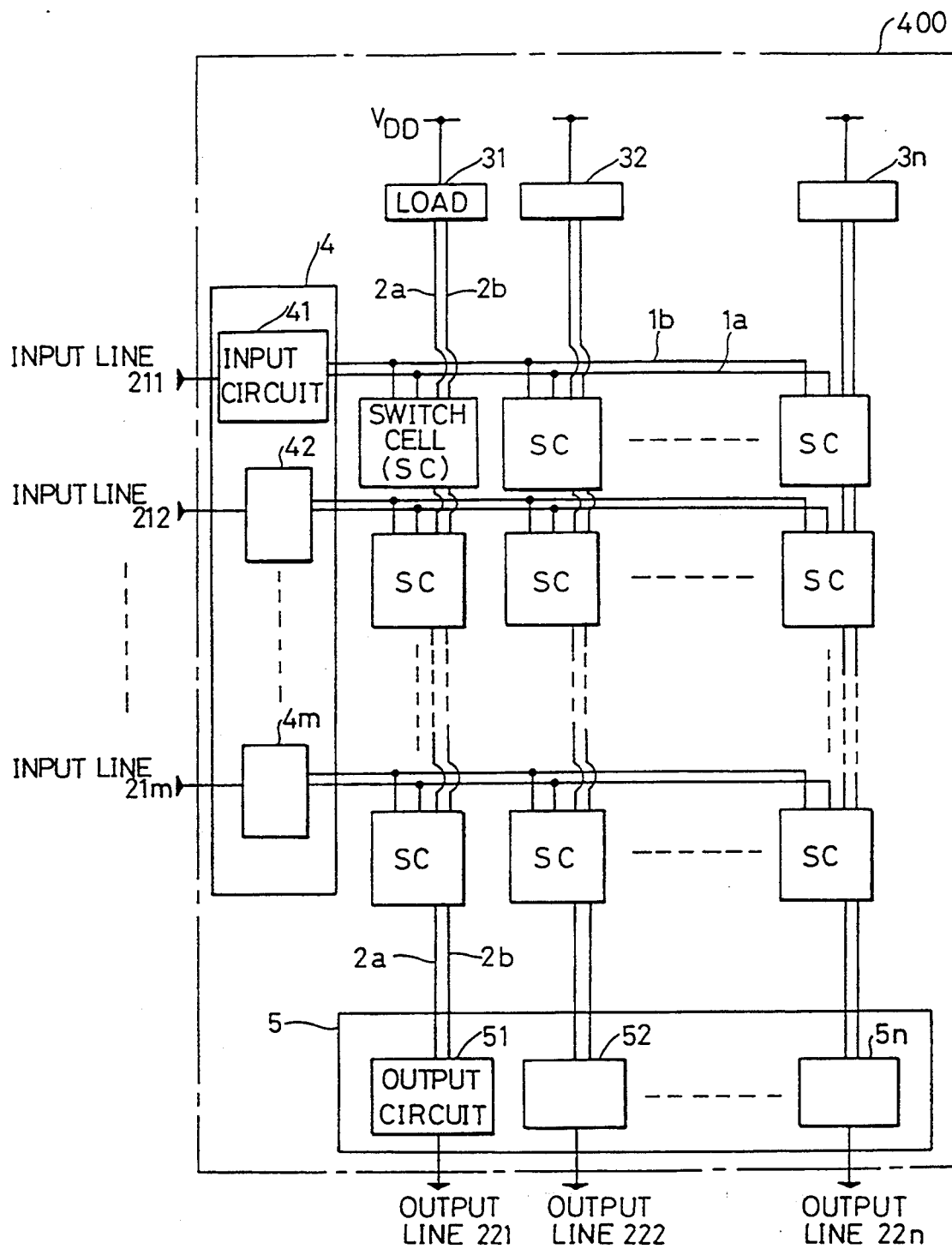
FIG. 1 is a block diagram of a crosspoint switching LSI illustrating one embodiment of the present invention.
Figure 14:
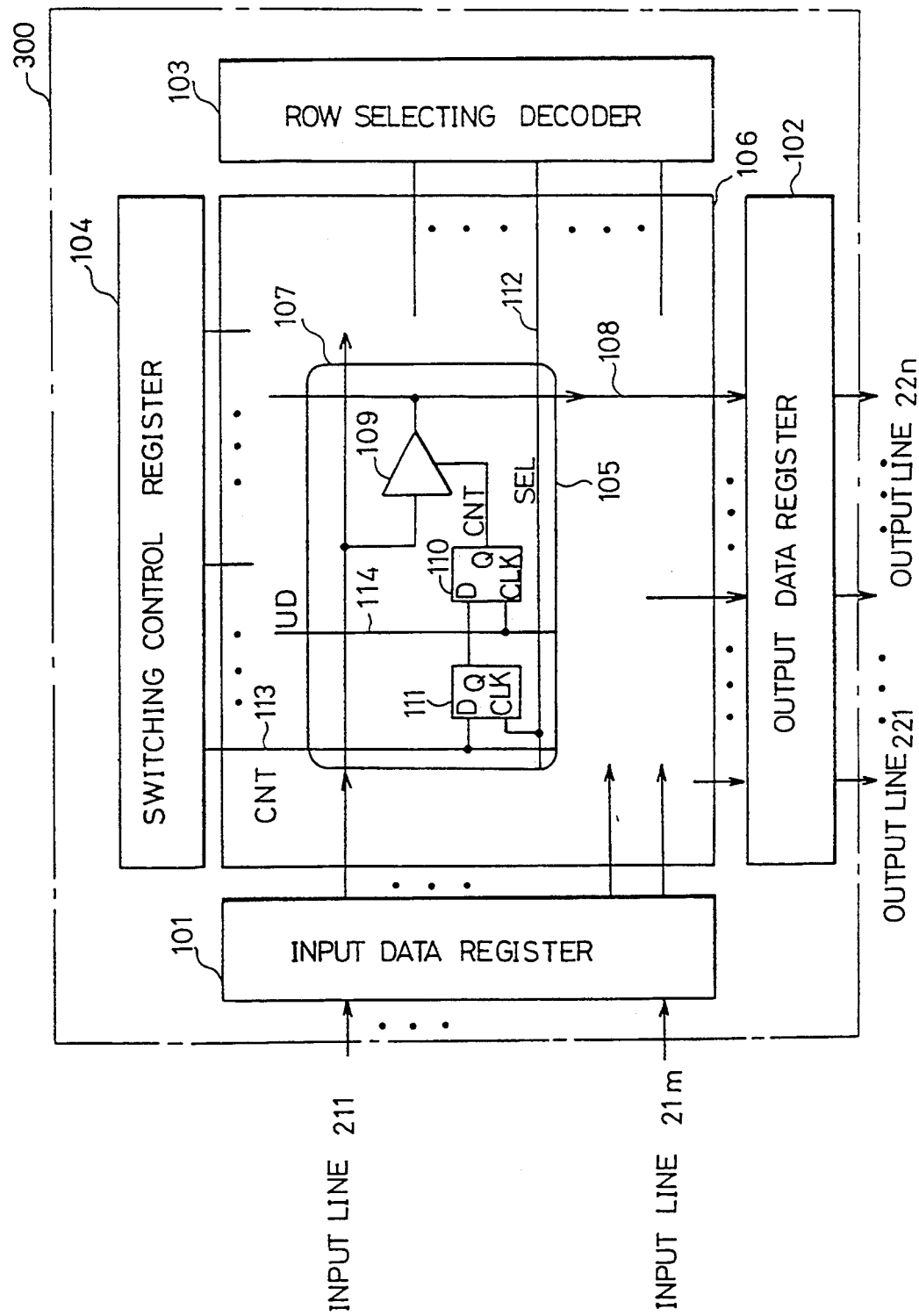
FIG. 14 is a block diagram of a conventional crosspoint switching LSI.
Figure 15:
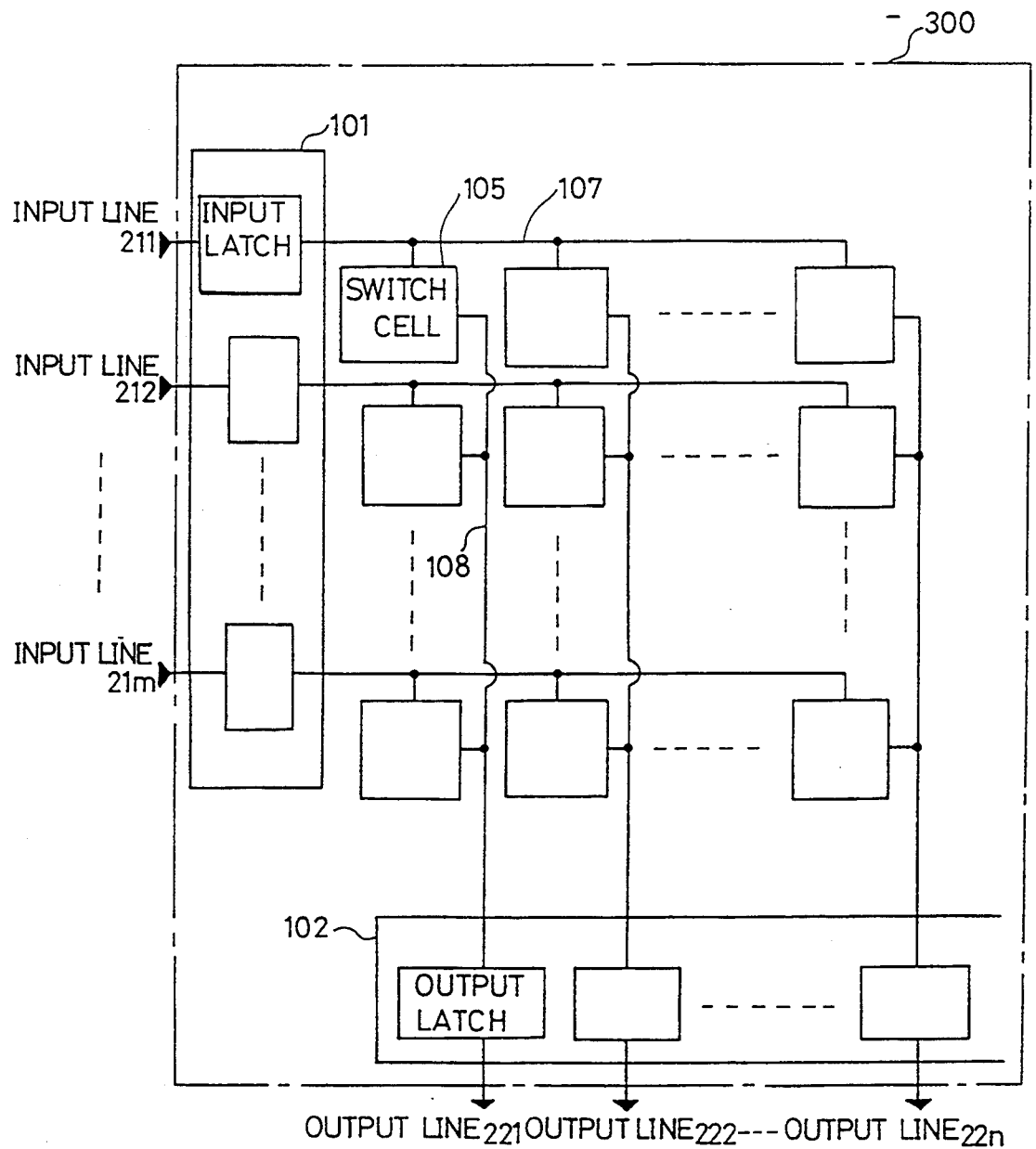
FIG. 15 is a circuit block diagram of a switch cell matrix in a conventional crosspoint switching LSI.

Referring to FIG. 1, a crosspoint switching LSI 400 includes an input data register 4 provided with input circuits 41 to 4m, an output data register 5 provided with output circuits 51 to 5n, and unit switch cells SC arranged in m rows and n columns. Each of the input circuits 41 to 4m is connected to an input data line pair in each row, while each of the output circuits 51 to 5n is connected to an output data line pair in each column. Load circuits 31 to 3n are respectively connected between a supply potential $V_{DD}$ and the output data line pairs. Although the crosspoint switching LSI 400 shown in FIG. 1 includes circuits corresponding to the row selecting decoder 103 and the switching control register 104 shown in FIG. 14, these are not shown for simplification purpose. It is pointed out that the line 400 indicates a semiconductor substrate, too.

Each of the input circuits 41 to 4m, for example, the input circuit 41 applies complimentary data signals (data signals inverted to each other, or differential data signals) to an input data line pair 1a and 1b, in response to an ATM cell applied via an input line 211, while each of the output circuits 51 to 5n, for example, the output circuit 51 receives differential data signals on an output data line pair 2a and 2b to apply output signals constituting the ATM cell to an output line 221.

Figure 2:
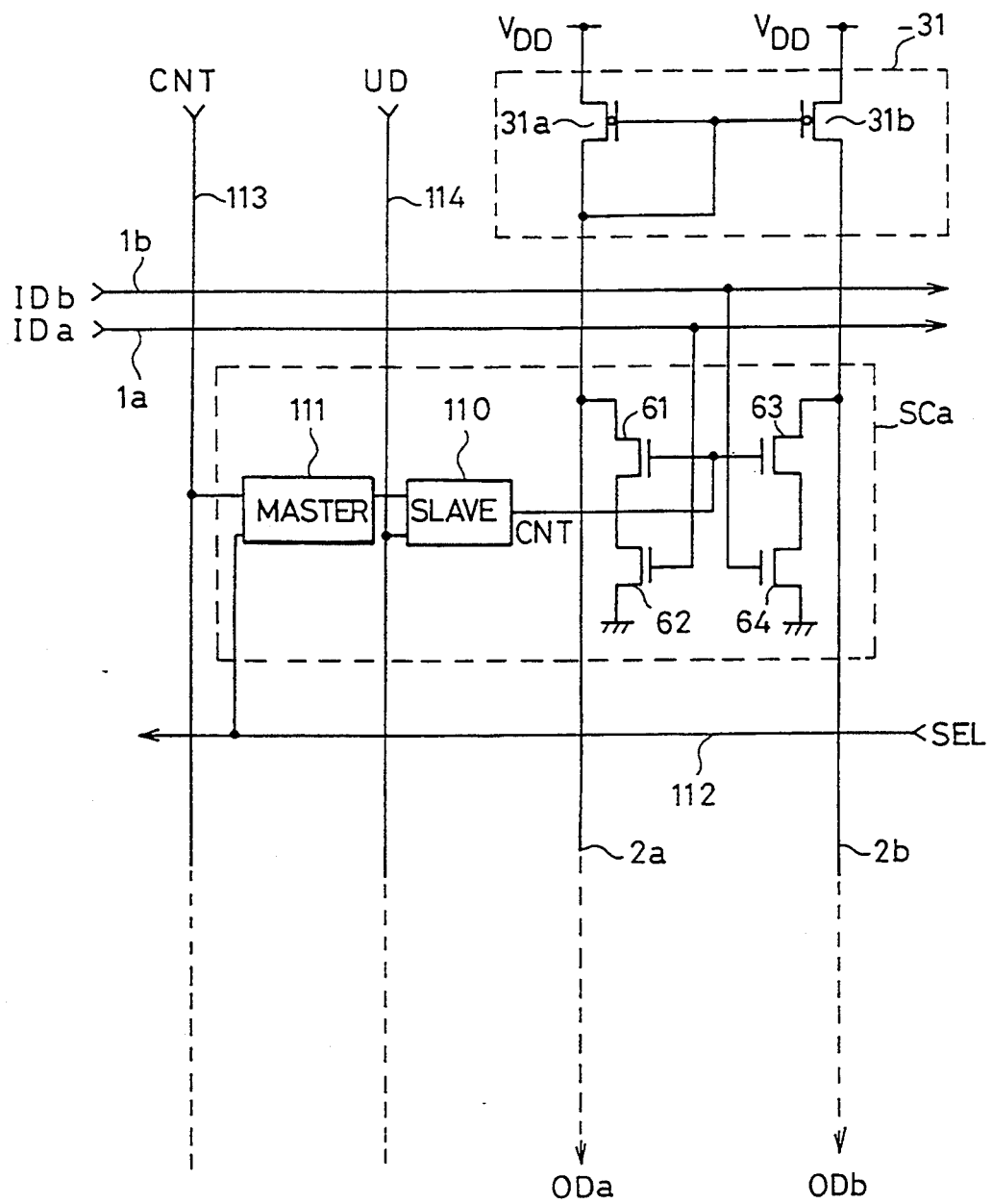
FIG. 2 is a schematic diagram of a circuit of the unit switch cell shown in FIG. 1.

FIG. 2 is a schematic diagram of a circuit of the unit switch cell shown in FIG. 1. A switch cell SCa shown in FIG. 2 can be adapted as the switch cell SC in the crosspoint switching LSI 400 shown in FIG. 1.

Referring to FIG. 2, the unit switch cell SCa includes NMOS transistors 61 to 64, a slave latch circuit 110, and a master latch circuit 111. Gates of the transistors 61 and 63 are connected so as to receive a present switching control signal CNT held in the slave latch circuit 110; the transistor 62 has its gate connected to the input data line 1a; the transistor 64 has its gate connected to the input data line 1b; a drain of the transistor 61 is connected to the output data line 2a; and a drain of the transistor 63 is connected to the output data line 2b.

The load circuit 31 includes PMOS transistors 31a and 31b constituting a current mirror circuit. The transistors 31a and 31b are respectively connected between the supply potential $V_{DD}$ and the output data lines 2a and 2b.

Figure 16:
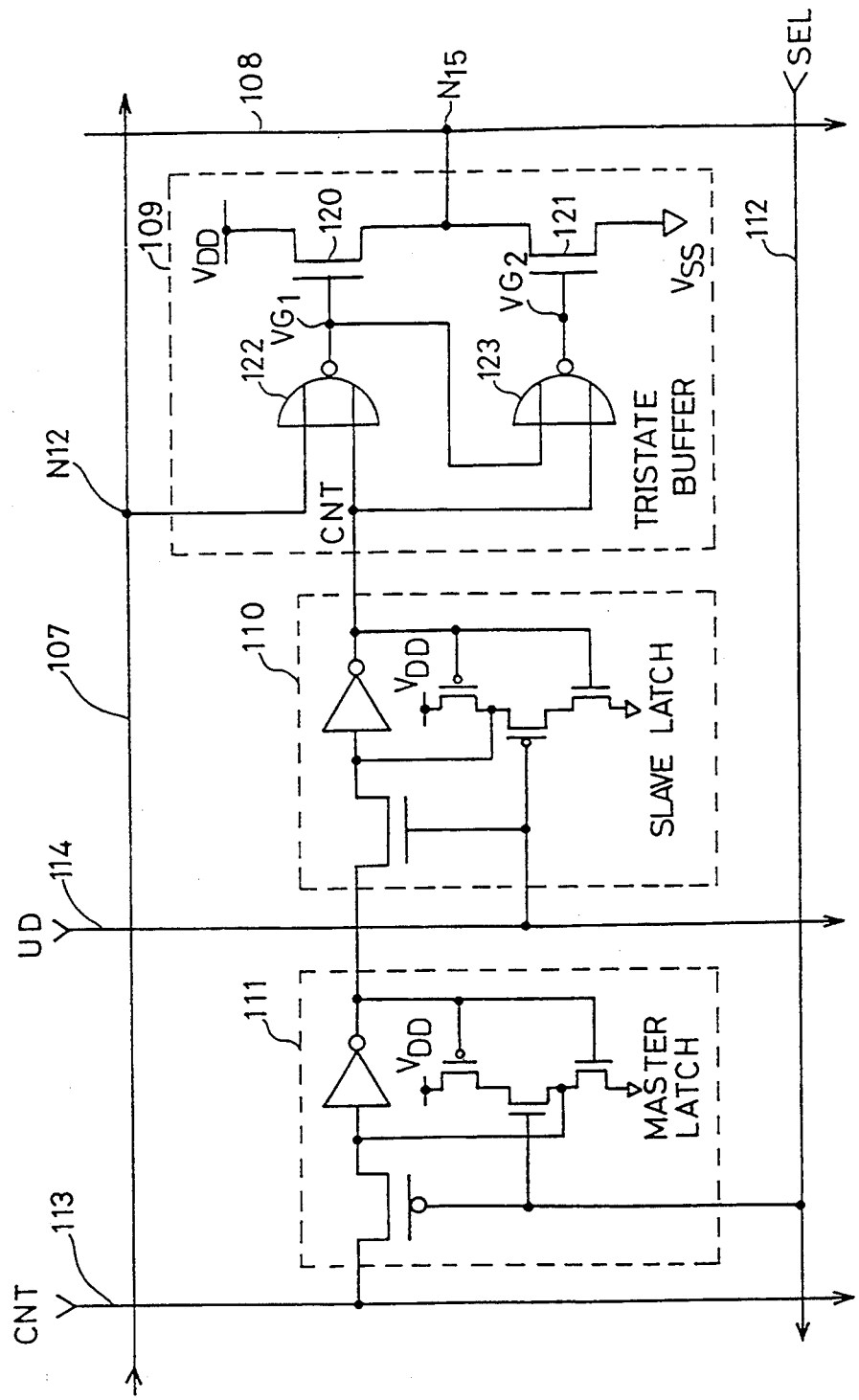
FIG. 16 is a schematic diagram of a circuit of a conventional unit switch cell.
Figure 17:
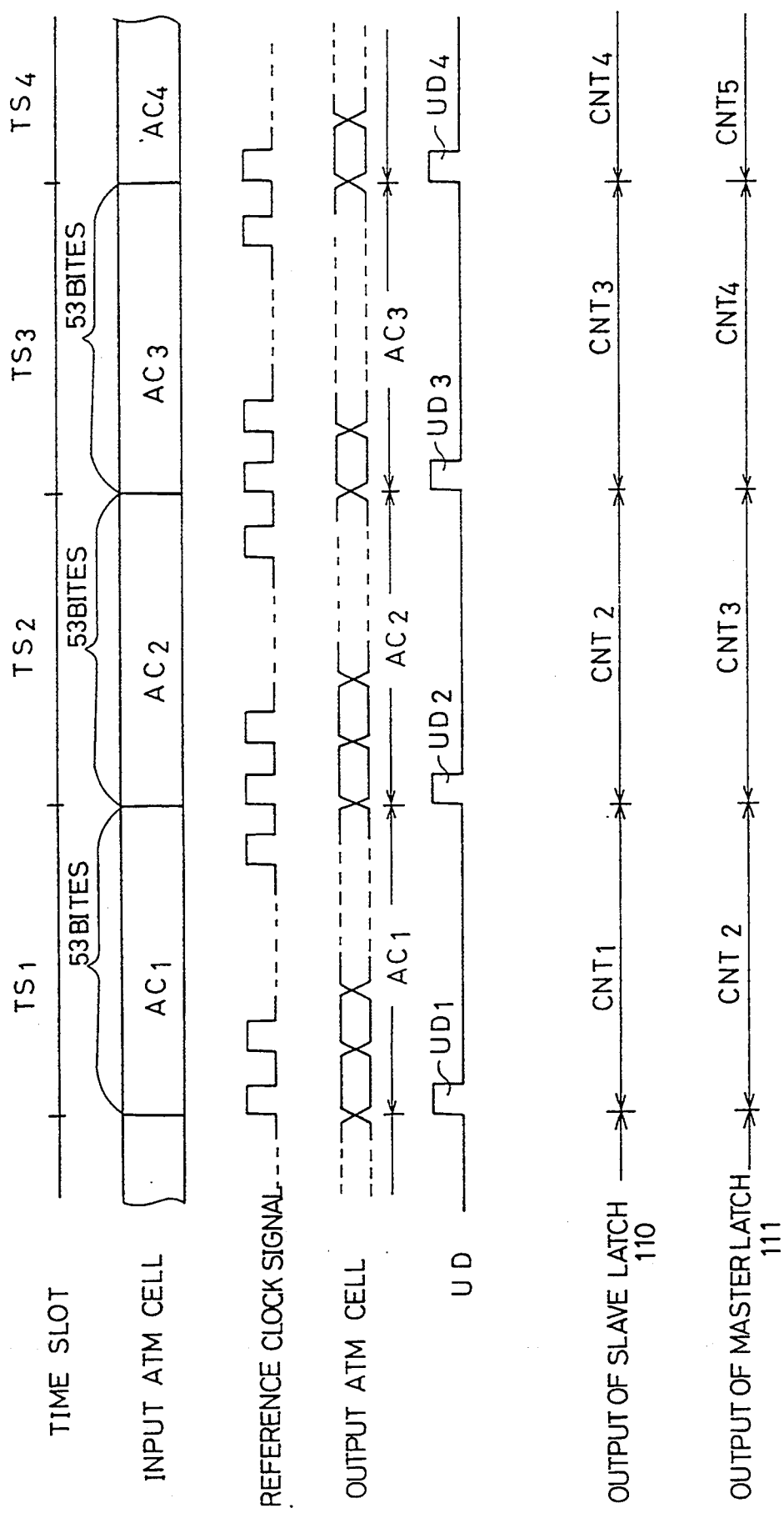
FIG. 17 is a time chart for illustrating operation of the unit switch cell shown in FIG. 16.

A description of application of the switching control signal CNT to the master latch circuit 111 and the slave latch circuit 110 is omitted since it is the same as that of the conventional unit switch cell shown in FIG. 16. Switching operation of the switch cell SCa is carried out as follows, in response to the present switching control signal CNT held in the slave latch circuit 110.

First, when the slave latch circuit 110 holds the switching control signal CNT at a high level, the transistors 61 and 63 are turned on. Therefore, when a signal on the input data line 1a is at a high level, the output data line 2a is supplied with a signal at a low level. Since a signal on the input data line 1b is at a low level, the output data line 2b is not connected to a ground potential, so that a potential of the output data line 2b attains a high level by operation of the current mirror circuit in the load circuit 31. A differential potential between the output data lines 2a and 2b is transmitted as output data signals ODa and ODb to the output circuit 51 shown in FIG. 1 which provides an output signal indicating an output ATM cell.

When the slave latch circuit 110 holds the switching control signal CNT at a low level, the transistors 61 and 63 are always turned off. Thus, the input data line pair 1a and 1b is not electrically connected to the output data line pair 2a and 2b. In other words, an input ANT cell on the input data line pair 1a and 1b is not applied to the output data line pair 2a and 2b.

In the unit switch cell SCa shown in FIG. 2, the transistors 62 and 64 constitute a driving circuit responsive to input data signals IDa and IDb for driving the output data lines 2a and 2b. Moreover, the transistors 61 and 63 constitute an enabling circuit responsive to the switching control signal CNT held in the slave latch circuit 110 for enabling the driving circuit constituted by the transistors 62 and 64.

Figure 3:
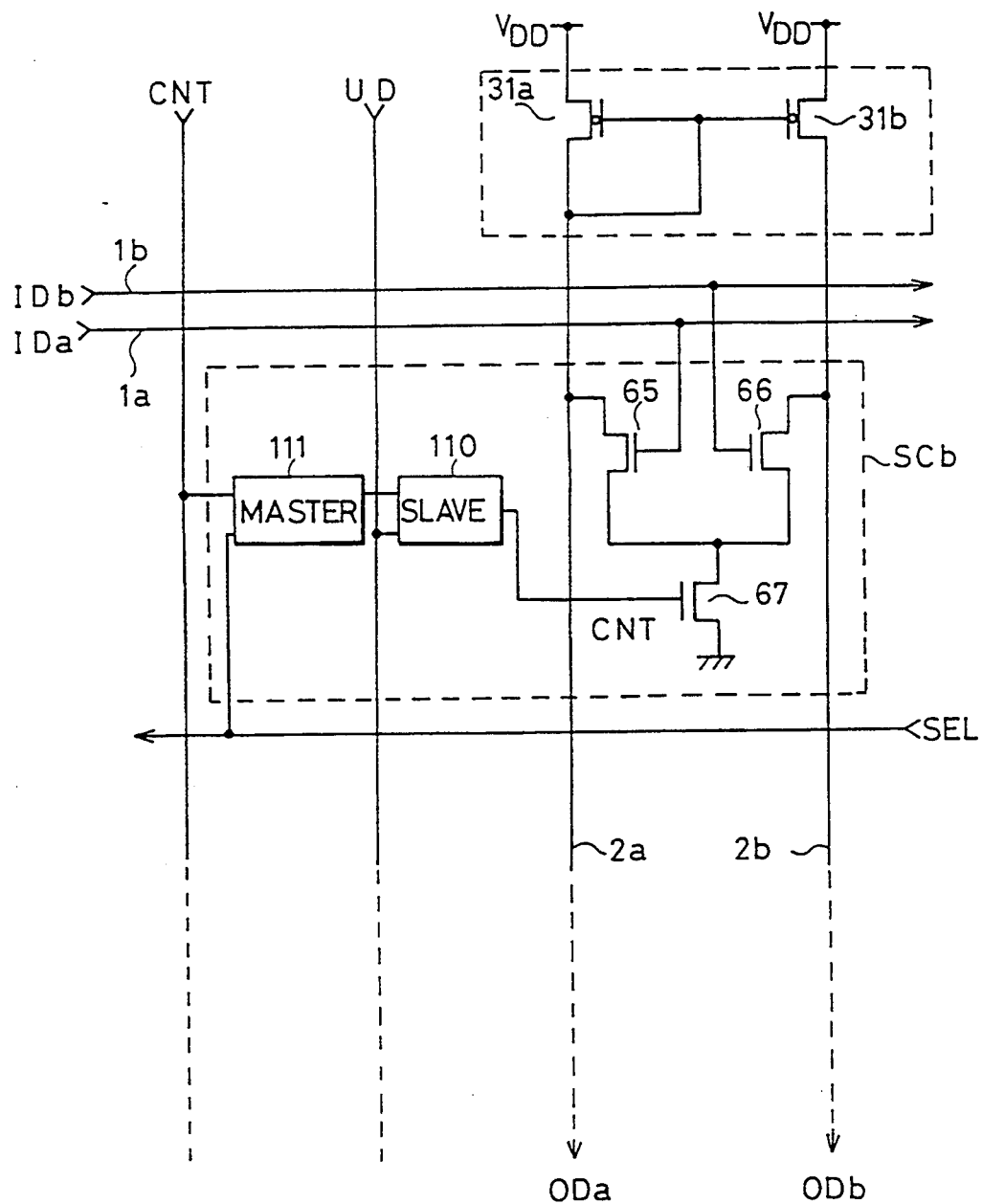
FIG. 3 is a schematic diagram of a circuit of a unit switch cell illustrating another embodiment of the present invention.

FIG. 3 is a circuit diagram of an unit switch cell showing another embodiment of the present invention. Referring to FIG. 3, a unit switch cell SCb includes NMOS transistors 65 and 66 constituting a driving circuit for driving the output data lines 2a and 2b, and an NMOS transistor 67 constituting an enabling circuit. Description of the other parts of the circuit is omitted since they are the same as those of the switch cell SCa shown in FIG. 2.

The single transistor 67 constituting an enabling circuit enables a driving circuit constituted by the transistors 65 and 66 in response to the switching control signal CNT held in the slave latch circuit 110. Description of switching operation is omitted since it is the same as that of the switch cell SCa shown in FIG. 2.

Figure 4:
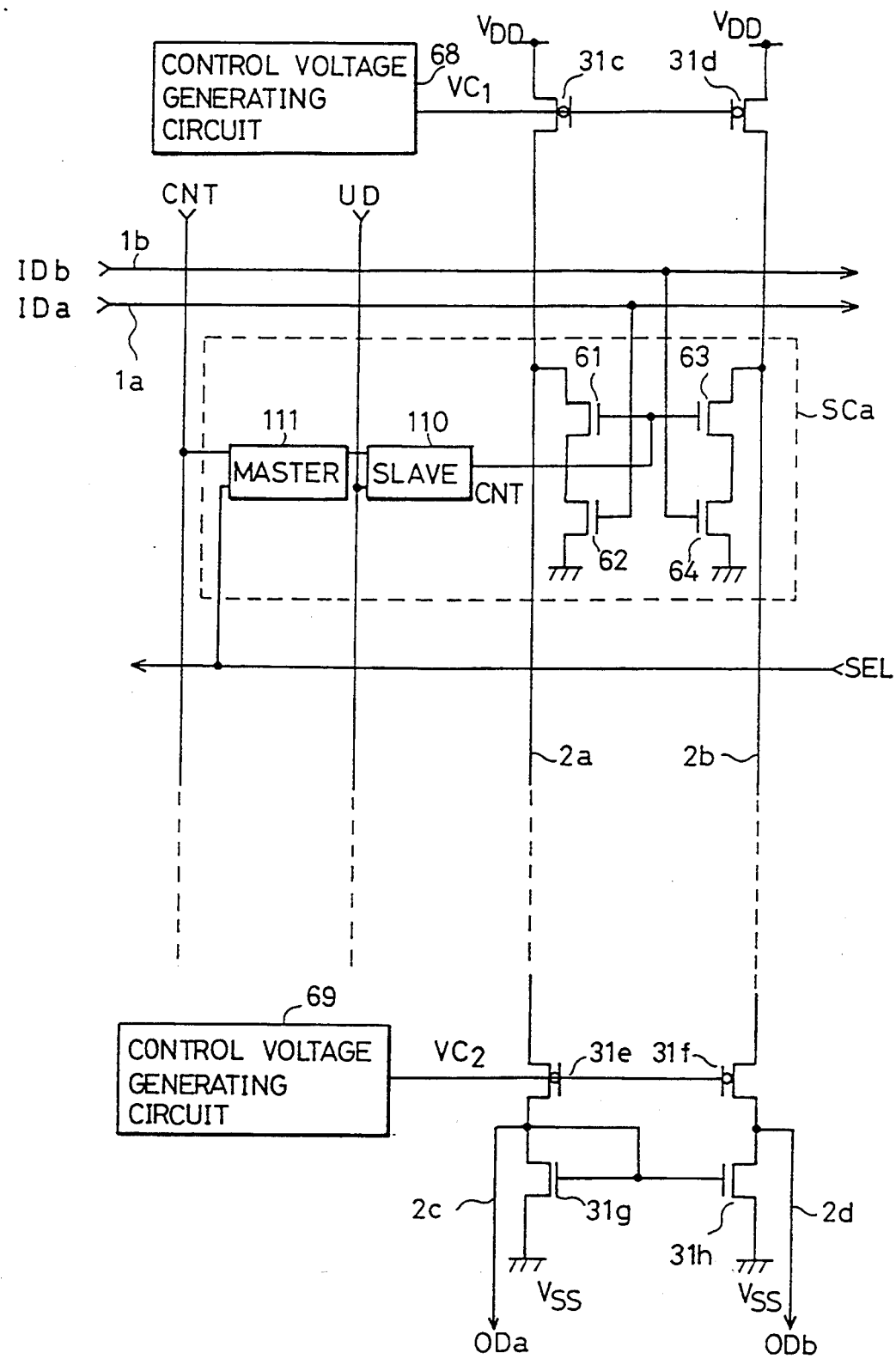
FIG. 4 is a schematic diagram of a circuit of a unit switch cell illustrating still another embodiment of the present invention.

FIG. 4 is a schematic diagram of a circuit of a unit switch cell illustrating a further embodiment of the present invention. The circuit shown in FIG. 4 is subjected to improvement for reduction of power consumption, comparing to the circuit shown in FIG. 2. More specifically, PMOS transistors 31c, 31d, 31e and 31f, and NMOS transistors 31g and 31h are provided as load circuits for the output data line pair 2a and 2b. The NMOS transistors 31g and 31h are respectively connected between the ground potential $V_{SS}$ and the output data line pair 2a and 2b to constitute a current mirror circuit. The transistors 31c and 31d are respectively connected between the supply potential $V_{DD}$ and the output data lines 2a and 2b. Gates of the transistors 31c and 31d are supplied with a control voltage VC1 suitably controlled by a control voltage generating circuit 68, so that on-resistance values of the transistors 31c and 31d become preferable values for reduction of power consumption. Similarly, gates of the transistors 31e and 31f are also supplied with a control voltage VC2 output from a control voltage generating circuit 69, so that on-resistance values of the transistors 31e and 31f become preferable values for reduction of power consumption. In other words, operation of the transistors 31c, 31d, 31e and 31f prevents unnecessary current flow via the output data line pair 2a and 2b, whereby the power consumption can be reduced comparing to that of the circuit shown in FIG. 2. The output data signals ODa and ODb to be transmitted to the output circuit 51 shown in FIG. 1 are transmitted via signal lines 2c and 2d.

Figure 5:
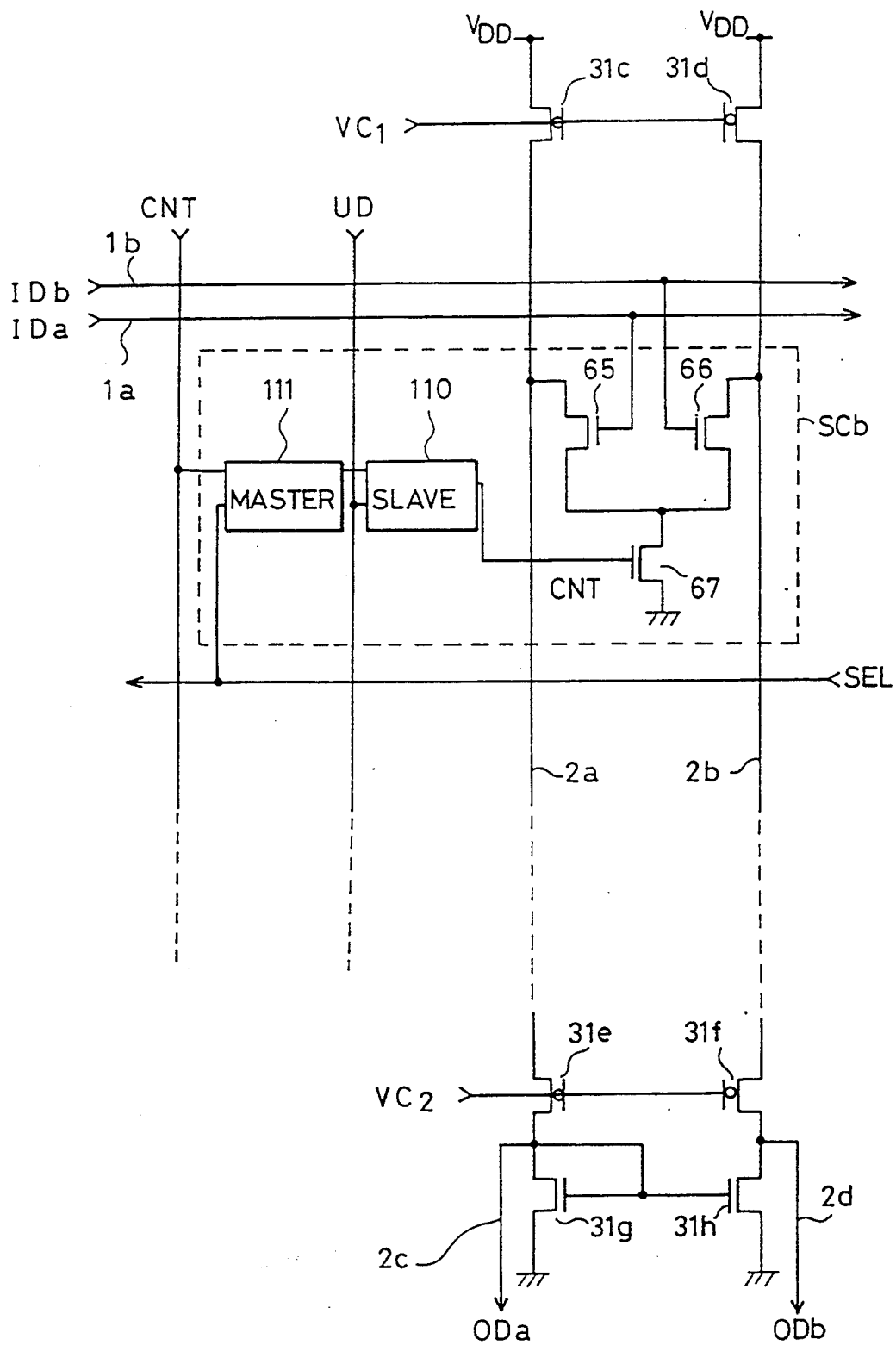
FIG. 5 is a schematic diagram of a circuit of a unit switch cell illustrating a further embodiment of the present invention.

FIG. 5 is a schematic diagram of a circuit of a unit switch cell illustrating still another embodiment of the present invention. Comparing to the circuit shown in FIG. 4, the circuit shown in FIG. 5 includes the unit switch cell SCb shown in FIG. 3 in place of the unit switch cell SCa. The other circuit structure is not described since it is the same as that in FIG. 4.

Following advantages are obtained by utilizing the circuits shown in FIG. 2 to FIG. 5 in a crosspoint switching LSI. First, since data signals which the unit switch cells SCa and SCb deal with are differential signals, data which changes at a high speed, i.e. data of a high frequency can be dealt with. More specifically, even in the case that differential input data signals IDa and IDb converted from ATM cells to be transmitted swing at a high speed, the switch cell circuit operates differentially, which enables the differential output data signals ODa and ODb swinging at a high speed according to the differential input data signals IDa and IDb, to be output.

In addition, since a circuit portion corresponding to the conventional tristate buffer 109 is replaced by three or four MOS transistors, it is pointed out that an occupied area of the unit switch cell on a semiconductor substrate can be reduced. By utilizing the unit switch cells SCa and SCb shown in FIG. 2 to FIG. 5, high integration of a crosspoint switching LSI can be accomplished, and a crosspoint switching LSI which can deal with many lines can be obtained.

Figure 6:
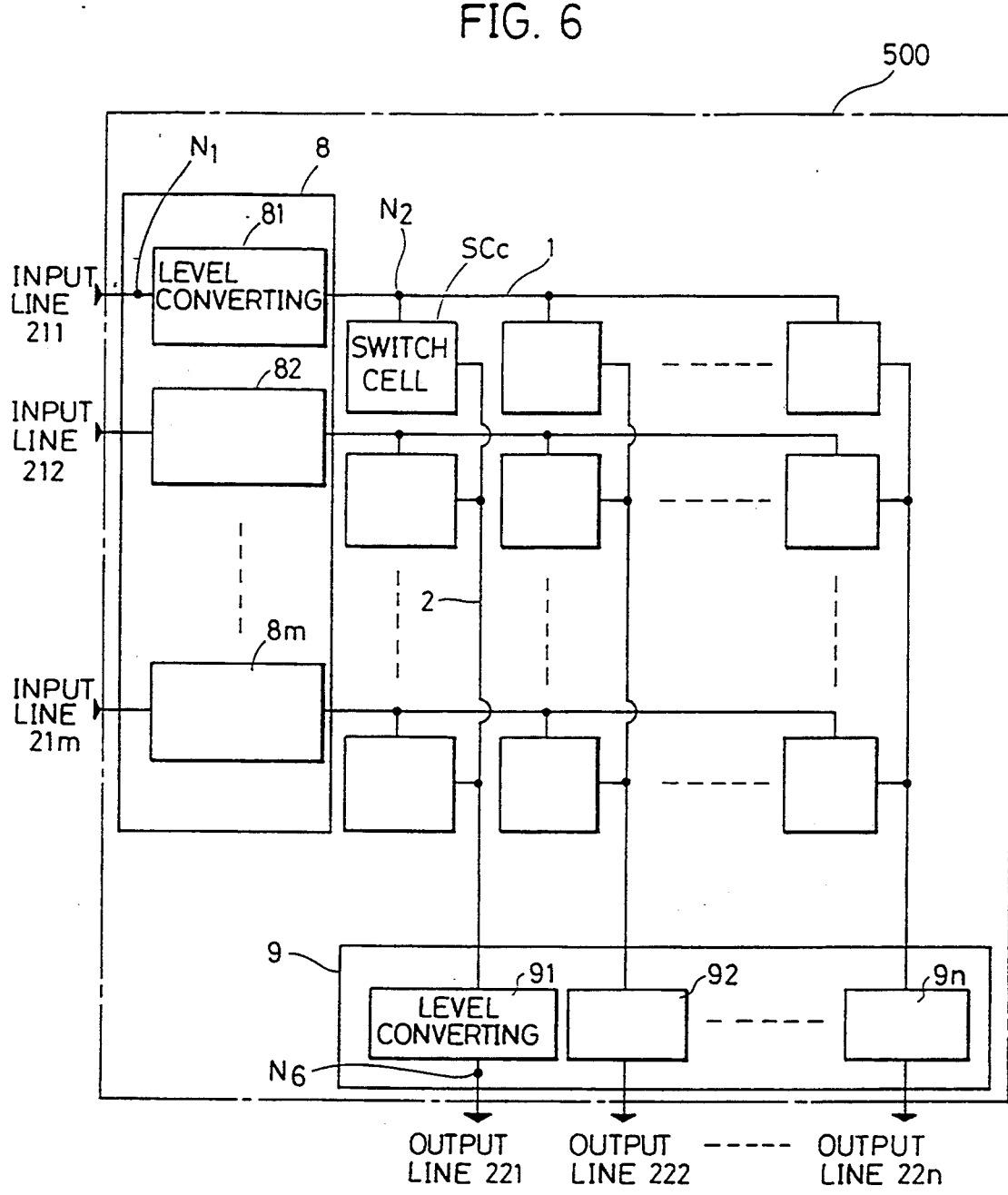
FIG. 6 is a block diagram of a crosspoint switching LSI illustrating a further embodiment of the present invention.

FIG. 6 is a block diagram of a crosspoint switching LSI illustrating a further embodiment of the present invention. Referring to FIG. 6, a crosspoint switching LSI 500 includes an input data register 8 provided with level converting circuits 81 to 8m, an output data register 9 provided with 91 to 9n, and switch cells SCc arranged in m rows and n columns. The level converting circuits 81 to 8m are respectively connected to the input data lines arranged in m rows. The level converting circuits 91 to 9n are respectively connected to the output data lines arranged in n columns. Although the crosspoint switching LSI 500 shown in FIG. 6 includes circuits corresponding to the row selecting decoder 103 and the switching control register 104 shown in FIG. 14, these are omitted to simplify the drawing. The line 500 indicates a semiconductor substrate, too.

The level converting circuits 81 to 8m provided in the input data register 8 convert signal levels of ATM cells on the input lines 211 to 21m from a CMOS level to a TTL level, while the level converting circuits 91 to 9n in the output data register 9 convert signal levels on the output data lines from the TTL level to the CMOS level. Details of these level converting circuits will be described later.

Figure 7:
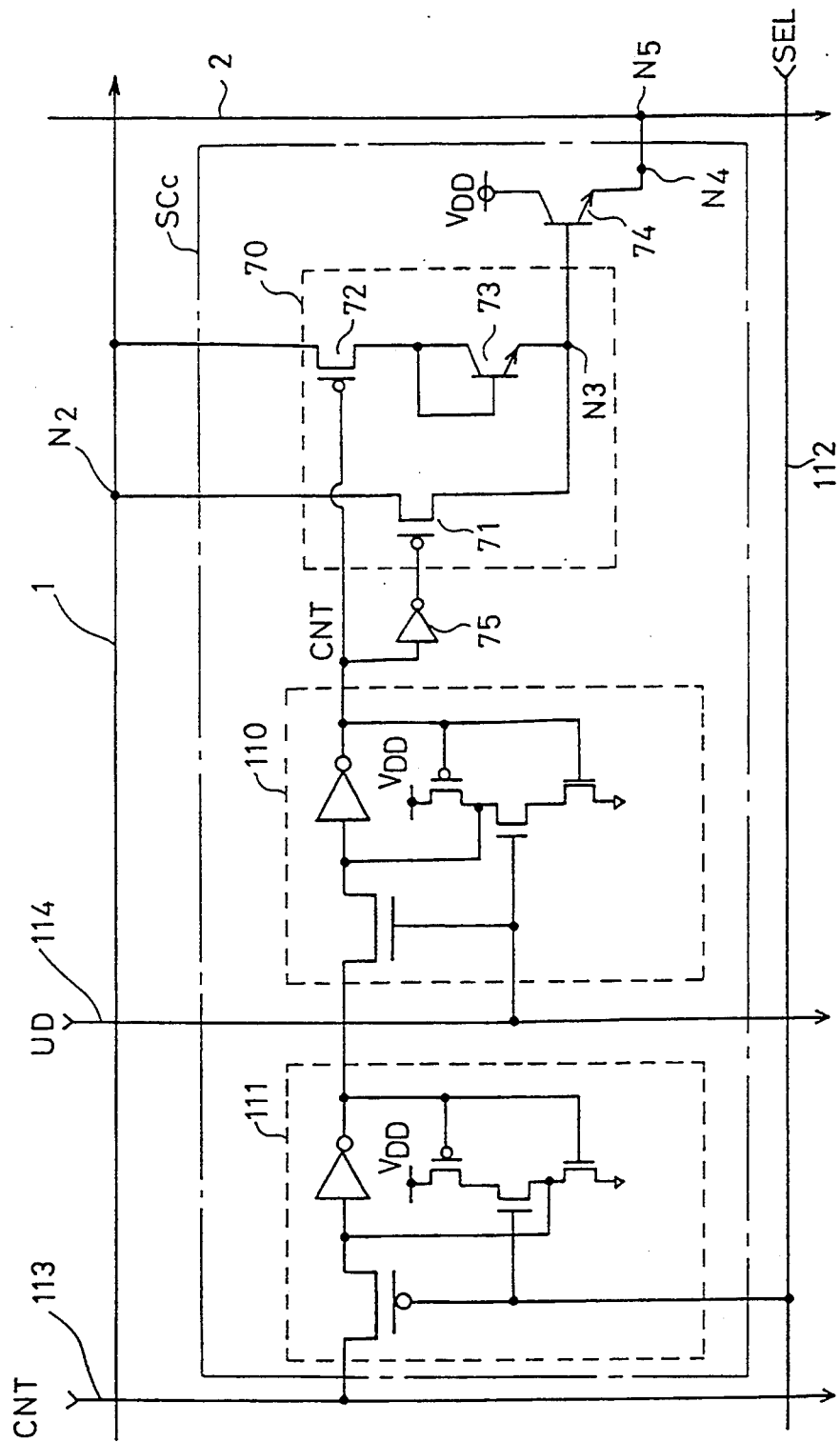
FIG. 7 is a schematic diagram of the unit switch cell shown in FIG. 6.

FIG. 7 is a schematic diagram of a circuit of the unit switch cell SCc adapted to the crosspoint switching LSI 500 shown in FIG. 6. Referring to FIG. 7, the unit switch cell SCc includes the master latch circuit 111, the slave latch circuit 110, an NPN transistor 74 for driving the output data line 2, and a base voltage control circuit 70 for controlling a base voltage of the transistor 74. The base voltage control circuit 70 includes PMOS transistors 71 and 72 and a NPN transistor 73. The transistor 72 has its gate connected to receive the switching control signal CNT held by the slave latch circuit 110. A gate of the transistor 71 receives a switching control signal /CNT inverted by an inverter 75. The transistor 73 serves as a diode, a collector and a base of which are commonly connected.

The master latch circuit 111 and the slave latch circuit 110, which have the same circuit structures as the conventional ones shown in FIG. 16, and operate in the same manner, are not described.

Figure 8:
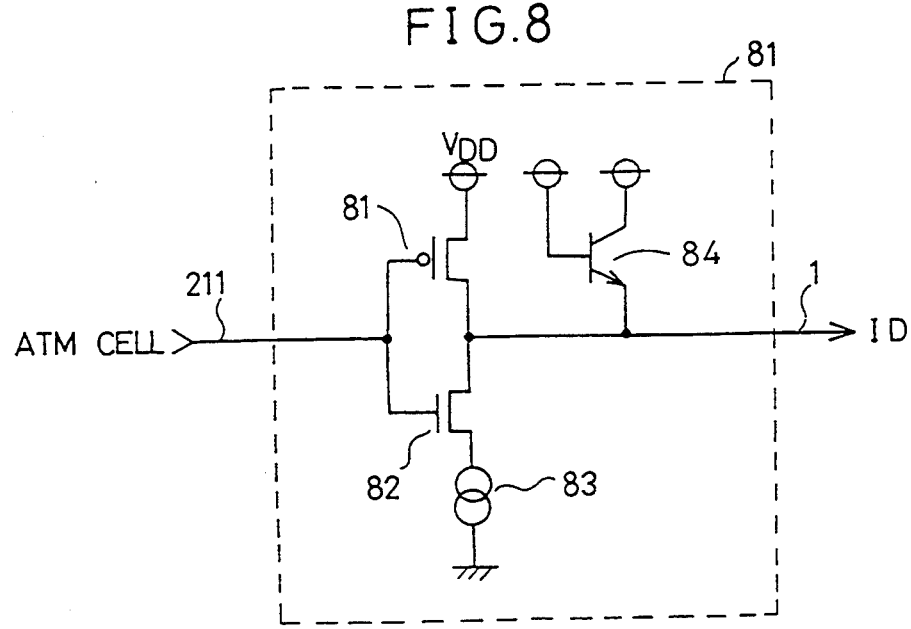
FIG. 8 is a schematic diagram of the level converting circuit for inputs shown in FIG. 6.

FIG. 8 is a diagram of the level converting circuit 81 for input shown in FIG. 6. Referring to FIG. 8, the level converting circuit 81 includes a PMOS transistor 81, an NMOS transistor 82, a constant current source 83, and an NPN transistor 84. Gates of the transistors 81 and 82 are connected so as to receive data signals, i.e. ATM cells, on the input line 211.

In operation, if an input signal of a low level is applied, the transistor 81 is turned on, and a signal ID with a potential $V_{DD}$ is applied to the input data line 1. Conversely, if an input signal at a high level is applied, the transistors 82 is turned on, whereby the NPN transistor 84 is turned on, and the signal ID with a potential $V_{DD}-V_{BE}$ is applied to the input data line 1; where $V_{BE}$ indicates a base-emitter voltage (approximately 0.7 volt) of the NPN transistor 84. As a result, the level converting circuit 81 converts an input signal changed in a range of the CMOS level to the signal ID changed in the range of the TTL level. The constant current source 13 so operates as to restrict to a predetermined value a current consumed when the transistor 84 is turned on.

Figure 9:
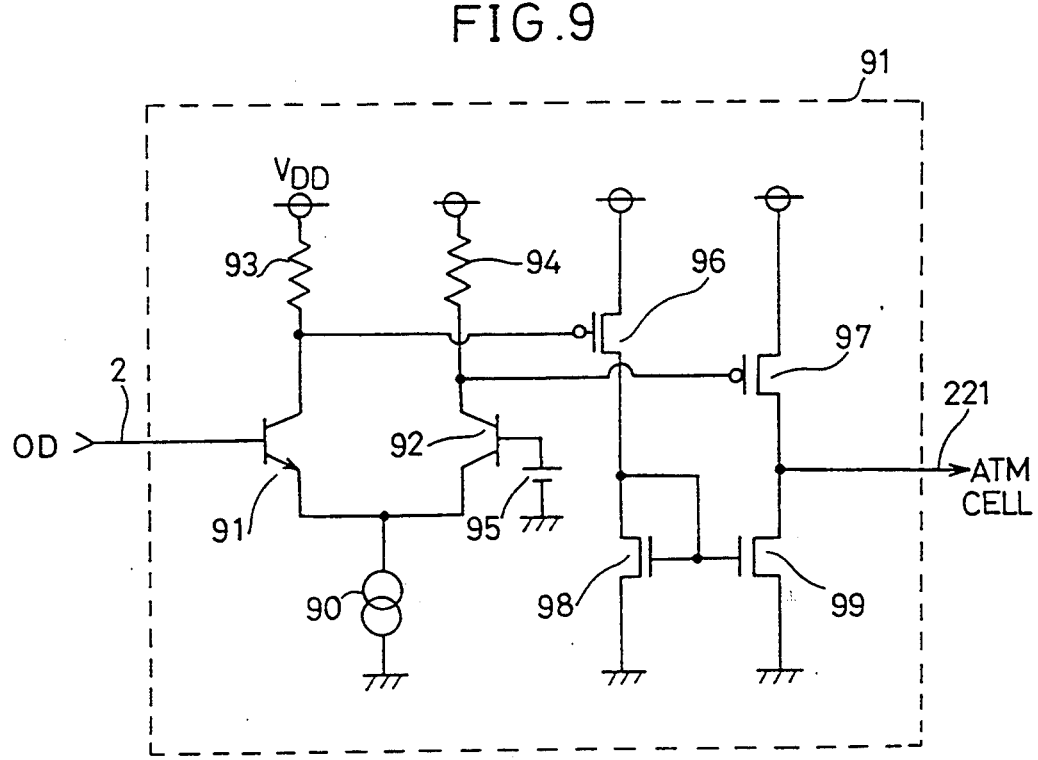
FIG. 9 is a schematic diagram of the level converting circuit for outputs shown in FIG. 7.
Figure 11:
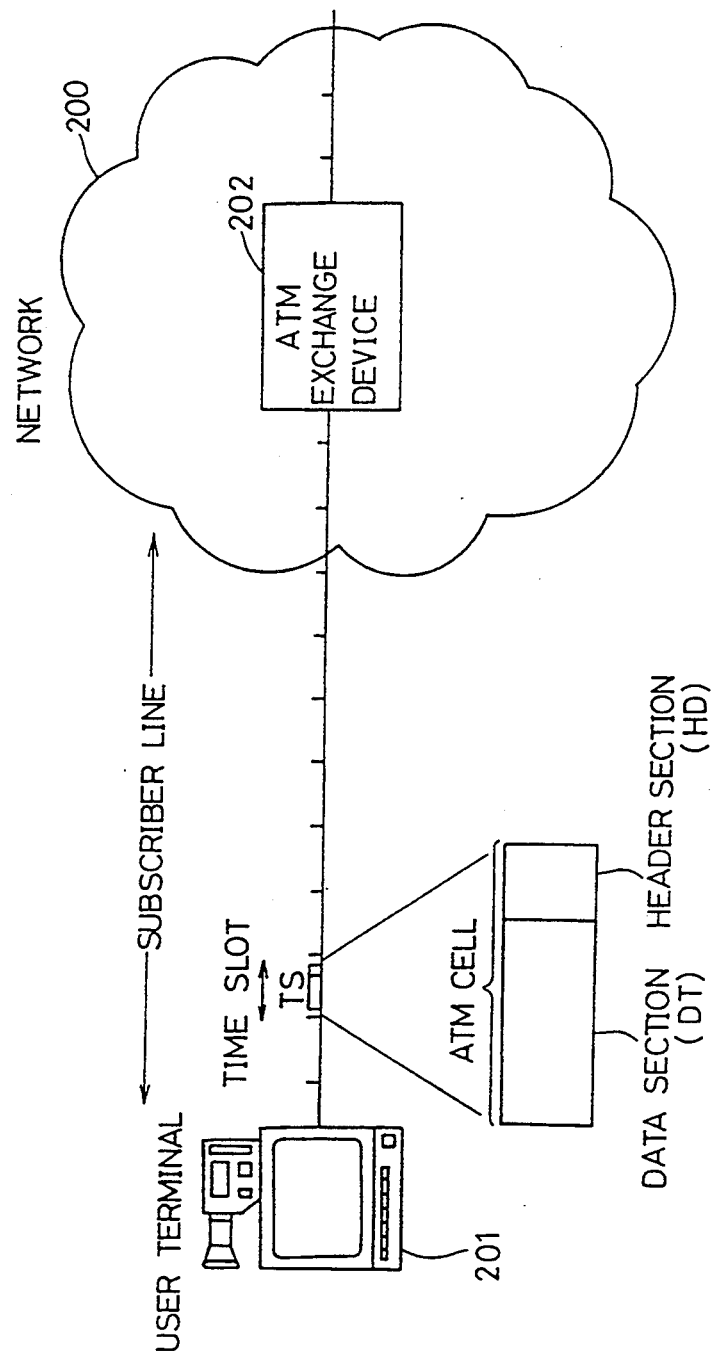
FIG. 11 is a conceptional view showing a conception of a communication system utilizing an ATM.
Figure 12:
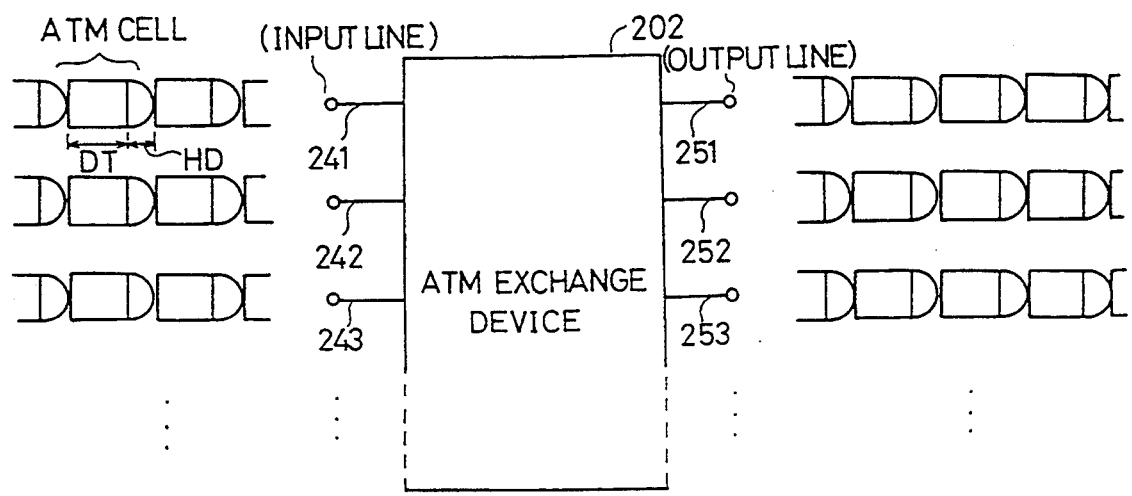
FIG. 12 is a conceptional view showing a conception of operation of an ATM exchange device.
Figure 13:
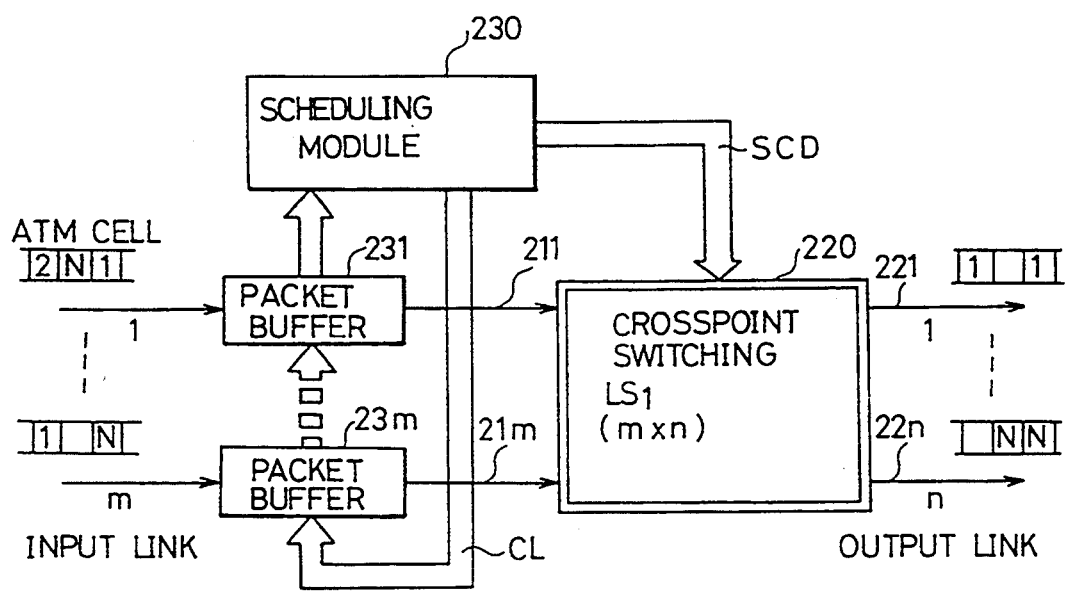
FIG. 13 is a block diagram of a conventional ATM exchange device.

FIG. 9 is a diagram of the level converting circuit 91 for output shown in FIG. 6. Referring to FIG. 9, the level converting circuit 91 includes a constant current source 90 constituting a differential amplifier circuit, NPN transistors 91 and 92, resistances 93 and 94, a constant voltage source 95, NPN transistors 98 and 99 constituting a current mirror circuit, and PMOS transistors 96 and 97. A base of the transistor 91 is so connected as to receive an output data signal OD via the output data line 2. A base of the transistor 92 is connected to an output of the constant voltage source 95. A commonly connected node of transistors 97 and 99 is connected to the output line 221.

The differential amplifier circuit which constitutes a comparator compares a potential of a signal on the output data line 2 and a voltage output from the constant voltage source 95. The transistors 96 and 97 operate in response to a differential signal output from the differential amplifier circuit. Since the output data line 221 is driven by the PMOS transistor 97 and the NMOS transistor 99, output signals changed in the range of the CMOS level is provided to the output line 221 as an ATM cell.

Referring again to FIG. 7, switching operation of the unit switch cell SCc will now be described. FIG. 10 is a table showing voltage transmission of each node in the unit switch cell SCc shown in FIG. 7. Nodes N2 to N5 shown in FIG. 10 correspond to nodes N2 to N5 shown in FIG. 7, while nodes N1, N2 and N6 shown in FIG. 10 correspond respectively to nodes N1, N2 and N6 shown in FIG. 6.

When a potential of the node N1 on the input line 211 is at a high level, i.e. the potential $V_{DD}$, a potential of the node N2 on the input data line 1 becomes the potential $V_{DD}-V_{VE}$ due to operation of the level converting circuit 81, and when the potential of the node N1 is at a low level, i.e. the potential $V_{SS}$, the potential of the node N2 becomes the power supply potential $V_{DD}$.

First, when the switch cell SCc is turned on, where the slave latch circuit 110 holds the switching control signal CNT at a high level, the transistor 71 shown in FIG. 7 is turned on and the transistor 72 is turned off. Consequently, the approximately same potential as that of the node N2 is applied to the node N3 at a base of the npn transistor 7. The NPN transistor 74 responds to the potential on the input data line 1 to selectively output a potential $V_{DD}-2V_{BE}$ or $V_{DD}-V_{BE}$ (node N4). A potential on the node N5 on the output signal line 2 thus corresponds to the potential of the node N4 at an emitter of the NPN transistor 74. More specifically, when the switch cell SCc is turned on, an output voltage of the NPN transistor 74 (a potential of the node N4) is followed by a potential on the output data line 2.

When the switch cell SCc is turned off, the slave latch circuit 110 holds the switching control signal CNT at a low level, and thus the switch cell SCc is rendered in off state. In this case, the transistor 71 is turned off and the transistor 72 is turned on, and a potential of the node N3 at an emitter of the NPN transistor 73 becomes $V_{DD}-2V_{BE}$ (when a potential of the node N2 is $V_{DD}-V_{BE}$), or $V_{DD}-V_{BE}$ (when a potential of the node N2 is $V_{DD}$). Since the transistor 74 is turned on in response to the potential of the node N3, an emitter potential of the transistor 74 in this case, i.e. a potential of the node N4, becomes $V_{DD}-3V_{BE}$ or $V_{DD}-2V_{BE}$.

When the switch cell SCc is turned off, the emitter potential of the transistor 74, i.e. the potential of the node N4, is not applied to the output data line, which will now be described. Referring again to FIG. 6, outputs of m switch cells arranged in a first column, for example, are connected to the output data line 2 to constitute a wired OR. In addition, only a single switch cell of the m switch cells SCc constituting the wired OR is turned on and the other switch cells are turned off. As can be seen from FIG. 10, an output potential of the single switch cell being turned on (a potential of the node N4) responds to a data signal to be transmitted to be the potential $V_{DD}-2V_{BE}$ or $V_{DD}-V_{BE}$. An output potential of the other switch cells being turned off (a potential of the node N4) becomes the potential $V_{DD}-3V_{BE}$ or $V_{DD}-2V_{BE}$. Therefore, a potential on the output signal line 2, i.e. a potential at the node N5 corresponds to the potential of the node N4 at the single switch cell being turned on because the m switch cells SCc connected to the output signal line 2 constitute the wired OR. In other words, the single switch cell being turned on provides as an output a preferential logical signal defined by the potential $-V_{DD}-2V_{BE}$ or $V_{DD}-V_{BE}$.

As a result, the potential of the output signal line 2, i.e. the potential of the node N5 responds to the input signal applied to the switch cell SCc being turned on to change in the range of the TTL level (i.e. $V_{DD}-2V_{BE}$ to $V_{DD}-V_{BE}$). The signal on the output signal line 2 is applied to the level converting circuit 91 shown in FIG. 9 to be converted to a signal which changes in the range of the CMOS level (i.e. $V_{DD}$ to $V_{SS}$).

Figure 18:
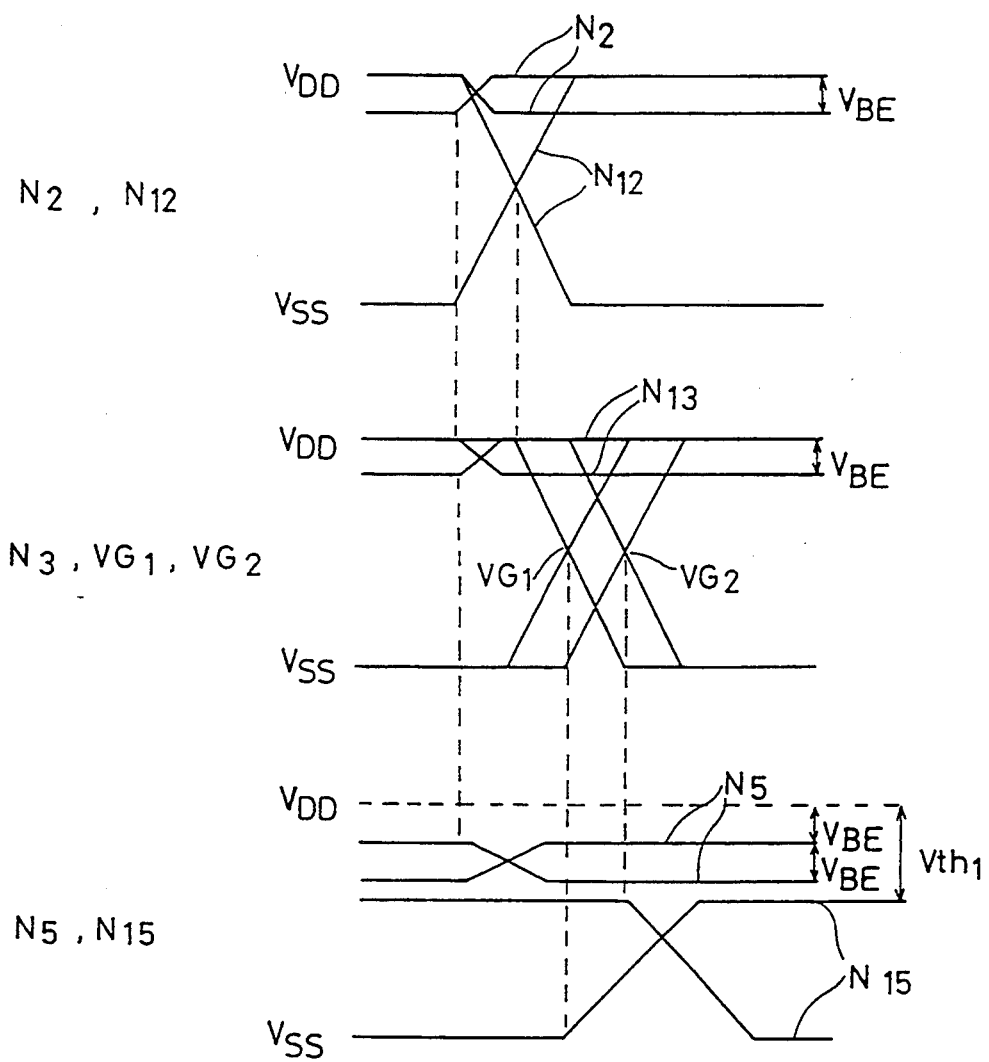
FIG. 18 is a table showing potential transmission of a node in each unit switch cell circuit shown in FIGS. 7 and 16.

FIG. 18 is a table showing potential transmission of a node in the unit switch cell circuit SCc shown in FIG. 7. For comparing with a conventional circuit, change of potentials at corresponding nodes in the unit switch cell shown in FIG. 16 are also illustrated. More specifically, changes of respective potentials at the nodes N2, N3 and N5 shown in FIG. 7, and the nodes N12 and N15 and the voltages VG1 and VG2 shown in FIG. 16 are illustrated in FIG. 18. In the drawing, $V_{th}1$ indicates a threshold voltage of the transistor 120 shown in FIG. 16 (=approximately 1.5 volts).

As can be seen from FIG. 18, when the unit switch cell SCc shown in FIG. 7 is turned on, a data signal to be transmitted swings in the range of the TTL level. Since a data signal handled in the conventional unit switch cell (shown in FIG. 16) swings in the ranges of the CMOS level, the data signal transmitted via the unit switch cell SCc shown in FIG. 7 rises and falls evidently at a shorter period, as compared with the conventional circuit. This means that the unit switch cell SCc shown in FIG. 7 can be adapted to an ATM cell transmitted at a higher frequency. More specifically, a signal transmission rate in the crosspoint switching LSI is enhanced.

As described above, the unit switch cell circuits shown in FIG. 2 to FIG. 5 respond to differential signals on the input data line pair 1a and 1b to drive the output data line pair 2a and 2b by their differential operation, which enables the output data line pair 2a and 2b to be driven at a higher speed. In addition, each of the unit switch cells shown in FIG. 2 to FIG. 5 is simplified compared to the conventional circuit shown in FIG. 16 by reduction of an occupied area on the semiconductor substrate, so that higher integration of a crosspoint LSI can be accomplished.

Moreover, the unit switch cell SCc shown in FIG. 7 handles a data signal which swings in the range of the TTL level, thereby shortening time required for rising and falling of a data signal to be transmitted. More specifically, a data signal on the input data line 1 can be applied at a higher speed onto the output data line 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic crosspoint switching device, comprising:
    a plurality of input data line pairs arranged in rows, and transmitting a plurality of differential input data signals, respectively;
    a plurality of output data line pairs arranged in columns, and transmitting a plurality of differential output data signals, respectively;
    a plurality of switch cells arranged in said rows and columns, and selectively applying a differential signal on said plurality of input data line pairs to one of said plurality of output data line pairs;
    each of said switch cells comprising
        switching control signal storage means for storing a switching control signal for controlling a connection between a corresponding input data line pair and a corresponding output data line pair,
        differential driving means responsive to a differential potential at said corresponding input data line pair for driving differentially said corresponding output data line pair, and
        enabling means responsive to the switching control signal stored in said switching control signal storage means for enabling said differential driving means; and
    a plurality of current mirror circuit means, each connected between a first power supply potential and a corresponding one of said plurality of output data line pairs, wherein each of said current mirror circuit means operates so that a current equal to that flowing in one data line of the corresponding one of the output data line pairs, flows to the other data line.

2. The electronic crosspoint switching device according to claim 1, wherein said switching control signal storage means comprises a preceding switching control storage means for storing a preceding switching control signal transmitted in a preceding time period, and
    a succeeding switching control storage means for storing a succeeding switching control signal for a succeeding differential input data signal transmitted in a succeeding time period.

3. The electronic crosspoint switching device according to claim 2, wherein said succeeding switching control signal storage means comprises a master latch circuit for latching the succeeding switching control signal for the succeeding differential input data signal transmitted in the succeeding time period, and
    said preceding switching control signal storage means comprises a slave latch circuit for latching the preceding switching control signal for the preceding differential input data signal transmitted in the preceding time period.

4. The electronic crosspoint switching device according to claim 1, wherein said plurality of current mirror circuit means are included within a plurality of load circuit means, each connected between the first power supply potential and the corresponding one of said plurality of output data line.

5. The electronic crosspoint switching device according to claim 1, wherein said plurality of current mirror circuit means includes a plurality of PMOS transistors, each connected between said first power supply potential and the corresponding one of said plurality of output data line pairs.

6. The electronic crosspoint switching device according to claim 4, wherein said plurality of load circuit means comprises a plurality of current reducing means, each connected between said first power supply potential and a corresponding one of said plurality of output data line pairs, for reducing a current flowing in said corresponding one of the output data line pairs.

7. The electronic crosspoint switching device according to claim 1, wherein said differential driving means comprises
    a first switching means coupled between one data line of said corresponding one of the output data line pairs and a power supply potential, and responsive to a signal on the one data line of said corresponding one of the input data line pairs for being turned on, and
    a second switching means coupled between the other data line of said corresponding one of the output data line pairs and said second power supply potential, and responsive to a signal on the other data line of said corresponding one of the input data line pairs for being turned on.

8. The electronic crosspoint switching device according to claim 7, wherein said enabling means comprises
    a third switching means connected serially with said first switching means between the one data line of said corresponding one of the output data line pairs and said power supply potential, and responsive to the switching control signal stored in said switching control signal storage means for being turned on, and
    a fourth switching means connected serially with said second switching means between the other data line of said corresponding one of the output data line pairs, and responsive to the switching control signal stored in said switching control signal storage means for being turned on.

9. The electronic crosspoint switching device according to claim 6, wherein each of said current reducing means comprising
    a first field effect transistor connected between said first power supply potential and the one data line of said corresponding one of the output data line pairs, and
    a second field effect transistor connected between said first power supply potential and the other data line of said corresponding one of the output data line pairs,
    said first and second field effect transistors having their gates connected to receive a first predetermined control voltage.

10. The electronic crosspoint switching device according to claim 9, wherein each of said current reducing means further comprising
    a third field effect transistor connected between second power supply potential and the one data line of the corresponding one of the output data line pairs; and
    a fourth field effect transistor connected between said second power supply potential and the other data line of the corresponding one of the output data line pairs;
    said third and fourth field effect transistors having their gate connected to receive a second predetermined control voltage.

11. An electronic crosspoint switching device, comprising:
- a plurality of input lines receiving respectively a plurality of data to be transmitted;
- a plurality of output lines outputting respectively the plurality of data to be transmitted;
- a plurality of differential input data signal generating means, each being responsive to data on the corresponding one of said plurality of input lines for generating a corresponding differential input data signals;
- a plurality of input data line pairs arranged in rows, and transmitting said plurality of differential input data signals, respectively;
- a plurality of output data line pairs arranged in columns, and transmitting a plurality of differential output data signals, respectively;
- a plurality of switch cells arranged in said rows and columns, and applying selectively the differential signal on said plurality of input data line pairs to one of said plurality of output data line pairs;
- each of said switch cells comprising
  - switching control signal storage means for storing a switching control signal for controlling a connection between a corresponding input data line pair and a corresponding output data line pair,
  - a differential driving means responsive to a differential potential at said corresponding one of input data line pairs for driving differentially said corresponding one of output data line pairs, and
  - enabling means responsive to the switching control signal stored in said switching control signal storage means for enabling said differential driving means;
- a plurality of data applying means, each connected to a corresponding one of said corresponding differential output data line pairs for applying data to be transmitted to the corresponding one of said plurality of output lines; and
- a plurality of current mirror circuit means, each connected between a first power supply potential and a corresponding one of said plurality of output data line pairs., wherein each of said current mirror circuit means operates so that a current equal to that flowing in one data line of the corresponding one of the output data line pairs, flows to the other data line.

12. An electronic crosspoint switching device, comprising:
- a plurality of input lines arranged in rows, and transmitting a plurality of input data signals, respectively;
- a plurality of output data lines arranged in columns, and transmitting a plurality of output data signals, respectively; and
- a plurality of switch cells arranged in rows and columns and applying selectively the signal on one of said plurality of input data lines to one of said plurality of output data lines;
- each of said switch cell comprising
  - switching control signal storage means for storing a switching control signal for controlling a connection between a corresponding input data line and a corresponding output data line, and
  - an output data signal applying means responsive to a signal on said corresponding input data line for applying an output data signal to said corresponding output data line,
    - when said switching control signal storage means stores a switching control signal designating enabling, said output data signal applying means responding to the signal on said corresponding input data line to provide a preferential logic signal, reflecting a first relationship between an input voltage corresponding to the signal on the corresponding input data line and a base emitter voltage of the output data signal applying means, as said output data signal,
    - when said switching control signal storage means stores a switching control signal designating disabling, said output data signal applying means responding to the signal on said corresponding input data line to provide a non-preferential logic signal, reflecting a second relationship between the input voltage and the base emitter voltage, as said output data signal,
  - potentials of said plurality of output data lines being determined by the signal provided from said output data signal applying means.

13. The electronic crosspoint switching device according to claim 12, wherein the output data signal applying means provided in each of said plurality of switch cells arranged in a common column, constitute a wired logic circuit.

14. The electronic crosspoint switching device according to claim 13, wherein
said preferential logic signal is a voltage logic signal defined by two predetermined voltage levels,
said non-preferential logic signal is a reduced voltage logic signal defined by a voltage level which is lower than the voltage level of the corresponding preferential logic signal.

15. The electronic crosspoint switching device according to claim 12, wherein said output data signal applying means comprises a bipolar transistor which has its emitter connected to said corresponding output data line,
said bipolar transistor having its collector connected to a power supply voltage, and being turned on responsive to a signal on said corresponding output data line.

16. The electronic crosspoint switching device according to claim 12, wherein said switching control signal storage means comprises
a preceding switching control signal storage means for storing a preceding switching control signal for a preceding differential input data signal transmitted in a preceding time period, and
a succeeding switching control signal storage means for storing a succeeding switching control signal for a succeeding differential input data signal transmitted in a succeeding time period.

17. The electronic crosspoint switching device according to claim 16, wherein
said succeeding switching control signal storage means comprises a master latch circuit latching the succeeding switching control signal for the differential input data signal transmitted in the succeeding time period; and
said preceding switching control signal storage means comprises a slave latch circuit latching the preceding switching control signal for the differential input data signal transmitted in the preceding time period.

18. An electronic crosspoint switching device, comprising a plurality of input lines receiving respectively a plurality of receiving data, said receiving data are defined by a MOS logic level, comprising:
- a first level converting means for converting the receiving data on said plurality of input lines to a plurality of input data signals defined by a TTL level;
- a plurality of input data lines arranged in rows, and transmitting respectively said plurality of input data signals;
- a plurality of output data lines arranged in columns, and transmitting respectively a plurality of output data signals; and
- a plurality of switch cells arranged in rows and columns, and applying selectively the signal on one of said plurality of input data lines to one of said plurality of output data lines;
- each of said switch cell comprising:
    - switching signal storage means for storing a switching control signal for controlling a connection between a corresponding input data line and a corresponding output data line, and
    - output data signal applying means responsive to a signal on the corresponding input data line for applying to said corresponding output data line an output data signal defined by a TTL level,
    - when said switching control signal storage means stores a switching control signal designating enabling, said output data signal applying means responding the signal on said corresponding input data line to provide a preferential logic signal, reflecting a first relationship between an input voltage corresponding to the signal on the corresponding input data line and a base emitter voltage of the output data signal applying means, as said output data signal,
    - when said switching control signal storage means stores a switching control signal designating disabling, said output data storage means responding to the signal on said corresponding input data line to provide non-preferential logic signal, reflecting a second relationship between the input voltage and the base emitter voltage as said output data signal,
    - potentials of said plurality of output data lines are determined by the preferential and the non-preferential logic signals provided from said switching control signal storage means;
- a second level converting means for converting a signal on said plurality of output data lines to a plurality of transmitting data defined by a MOS logic level; and
- the plurality of output lines transmitting respectively said plurality of transmitting data.

* * * * *